(12) United States Patent
Tao (10) Patent No.: US 11,102,411 B2
(45) Date of Patent: Aug. 24, 2021

(54) GIMBAL PHOTOGRAPHING METHOD, GIMBAL CAMERA SYSTEM, AND STORAGE MEDIUM

(71) Applicant: SZ DJI TECHNOLOGY CO., LTD., Shenzhen (CN)

(72) Inventor: Ye Tao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/949,358

(22) Filed: Oct. 27, 2020

(65) Prior Publication Data

US 2021/0044751 A1 Feb. 11, 2021

Related U.S. Application Data (63) Continuation of application No. PCT/CN2018/085324, filed on May 2, 2018.

(51) Int. Cl.
*H04N 5/232* (2006.01)

(52) U.S. Cl.
CPC ..... *H04N 5/23258* (2013.01); *H04N 5/23299* (2018.08)

(58) Field of Classification Search
CPC ........... H04N 5/23258; H04N 5/23299; H04N 5/23203; B64D 47/08; G05D 3/12
USPC .................................................... 348/208.99
See application file for complete search history.

(56) References Cited

U.S. PATENT DOCUMENTS

| | | | | |
|---|---|---|---|---|
| 8,174,580 B2* | 5/2012 | Hayashi | ............ | H04N 5/23299 348/169 |
| 9,274,744 B2* | 3/2016 | Hart | ........... | H04N 7/142 |
| 10,054,946 B2* | 8/2018 | Shin | ............... | H04N 5/23258 |
| 10,301,019 B1* | 5/2019 | Canavor | ............... | H04W 4/02 |
| 10,735,653 B1* | 8/2020 | Huang | ............... | G06K 9/00255 |
| 10,965,975 B2* | 3/2021 | Wexler | ............ | H04N 21/44218 |
| 2009/0128618 A1 | 5/2009 | Fahn et al. | | |

(Continued)

FOREIGN PATENT DOCUMENTS

| | | |
|---|---|---|
| CN | 102158647 A | 8/2011 |
| CN | 102799191 A | 11/2012 |

(Continued)

OTHER PUBLICATIONS

The World Intellectual Property Organization (WIPO) International Search Report for PCT/CN2018/085324 dated Feb. 11, 2019 6 Pages.

*Primary Examiner* — Pritham D Prabhakher
(74) *Attorney, Agent, or Firm* — Anova Law Group, PLLC (57) ABSTRACT

A gimbal photographing method includes obtaining an external signal, processing the external signal to generate one or more gimbal action control instructions and one or more photographing control instructions, controlling a gimbal to perform a corresponding action according to at least one of the one or more gimbal action control instructions, and controlling a camera device to perform photographing according to at least one of the one or more photographing control instructions. The at least one of the one or more photographing control instructions cause the camera device to photograph along with the action performed by the gimbal during at least part of a whole photographing process.

18 Claims, 4 Drawing Sheets

(56) References Cited

U.S. PATENT DOCUMENTS

| | | | | |
|---|---|---|---|---|
| 2012/0062729 A1* | 3/2012 | Hart | .................. | H04N 7/142 |
| | | | | 348/135 |
| 2018/0059665 A1* | 3/2018 | Shin | .................. | B64D 47/08 |
| 2018/0204331 A1* | 7/2018 | Omari | .................. | G01S 13/878 |
| 2018/0259123 A1* | 9/2018 | Shim | .................. | F16M 11/041 |
| 2019/0098191 A1* | 3/2019 | Enke | .................. | G01C 21/10 |
| 2019/0259366 A1* | 8/2019 | Hansson | .................. | G10K 11/175 |

FOREIGN PATENT DOCUMENTS

| | | |
|---|---|---|
| CN | 103093487 A | 5/2013 |
| CN | 103248633 A | 8/2013 |
| CN | 103826103 A | 5/2014 |
| CN | 104828256 A | 8/2015 |
| CN | 205610783 U | 9/2016 |
| CN | 106292720 A | 1/2017 |
| CN | 106774128 A | 5/2017 |
| CN | 106933133 A | 7/2017 |
| CN | 107208836 A | 9/2017 |
| CN | 107645630 A | 1/2018 |

* cited by examiner

GIMBAL PHOTOGRAPHING METHOD, GIMBAL CAMERA SYSTEM, AND STORAGE MEDIUM

CROSS-REFERENCE TO RELATED APPLICATION

This application is a continuation of International Application No. PCT/CN2018/085324, filed May 2, 2018, the entire content of which is incorporated herein by reference.

TECHNICAL FIELD

The present disclosure relates to a gimbal photographing method, a gimbal camera system, and a storage medium.

BACKGROUND

Gimbal is a workstation configured to mount a camera device. The camera device is arranged at the gimbal to operate. As an existing gimbal product, for example, a gimbal camera, is broadly applied, thus, a camera product having a gimbal is gradually developed. A function of controlling gimbal motion (e.g., pitch, roll, and yaw rotations) is implemented, for example, delayed photographing and determining a gimbal rotation trajectory.

In the existing gimbal technology, stabilization is the only target for gimbal design. For example, for the gimbal camera, a roll axis of the gimbal is maintained at 0°, otherwise, a video may be considered as a bad video with tilting. In other words, the existing gimbal motion provides assistance to stabilize the photographing image.

In the existing technology, to obtain a video with a changing video recording angle, a handheld camera device such as a cell phone is usually operated manually, and no mechanically programmed gimbal software that controls the camera device to record such a video was disclosed. For example, during film photographing, if a segment of vibrating images needs to be obtained to match an image content (e.g., impactful image) and background music, a photographer needs to lock the gimbal and operate the camera device to realize such vibration, which is difficult and requires the photographer to have a high-level professional skill.

In the existing technology, various technologies are disclosed to change parameters of the camera device mounted at the gimbal. However, no technology is disclosed to combine the technologies of photographing the image motion with a specific requirement (e.g., vibrating an image) and changing parameters of the camera device to obtain a rich performance effect.

In summary, if a video with the image motion of a specific requirement and rich performance effect by changing the photographing parameters needs to be photographed by the camera device mounted at the gimbal, no solution is provided in the existing technology. In another aspect, during the video recording, such an image having the specific requirement usually corresponds to background music of a specific style to achieve a most rendering video effect from both audio and visual effect aspects. However, in the existing technology, the professional video photographer may need to analyze music style by themselves and select or design a corresponding recording motion, which is difficult to operate and not suitable for a normal consumer.

SUMMARY

Embodiments of the present disclosure provide a gimbal photographing method. The method includes obtaining an external signal, processing the external signal to generate one or more gimbal action control instructions and one or more photographing control instructions, controlling a gimbal to perform a corresponding action according to at least one of the one or more gimbal action control instructions, and controlling a camera device to perform photographing according to at least one of the one or more photographing control instructions. The at least one of the one or more photographing control instructions cause the camera device to photograph along with the action performed by the gimbal during at least part of a whole photographing process.

Embodiments of the present disclosure provide a gimbal camera system including a gimbal device and a camera device. The gimbal device includes a gimbal, a gimbal action controller, an external signal acquisition circuit, and a processor. The gimbal action controller is configured to cause the gimbal to perform an action. The camera device is carried by the gimbal. The external signal acquisition circuit is configured to obtain an external signal. The processor is configured to control the gimbal device and the camera device to process the external signal to generate one or more gimbal action control instructions and one or more photographing control instructions, control the gimbal action controller to cause the gimbal to perform a corresponding action according to at least one of the one or more gimbal action control instructions, and control the camera device to photograph according to at least one of the one or more photographing control instructions. The camera device is caused to photograph along with the action performed by the gimbal during at least part of a whole photographing process.

DETAILED DESCRIPTION OF THE EMBODIMENTS

The present disclosure aims to solve the above problems, and realize capturing of a video with image motion according to a specific requirement and a rich performance effect obtained by changing photographing parameters using a camera device mounted at the gimbal.

Embodiments and implementations of the present disclosure are described below with reference to the accompanying drawings.

Figure 4:
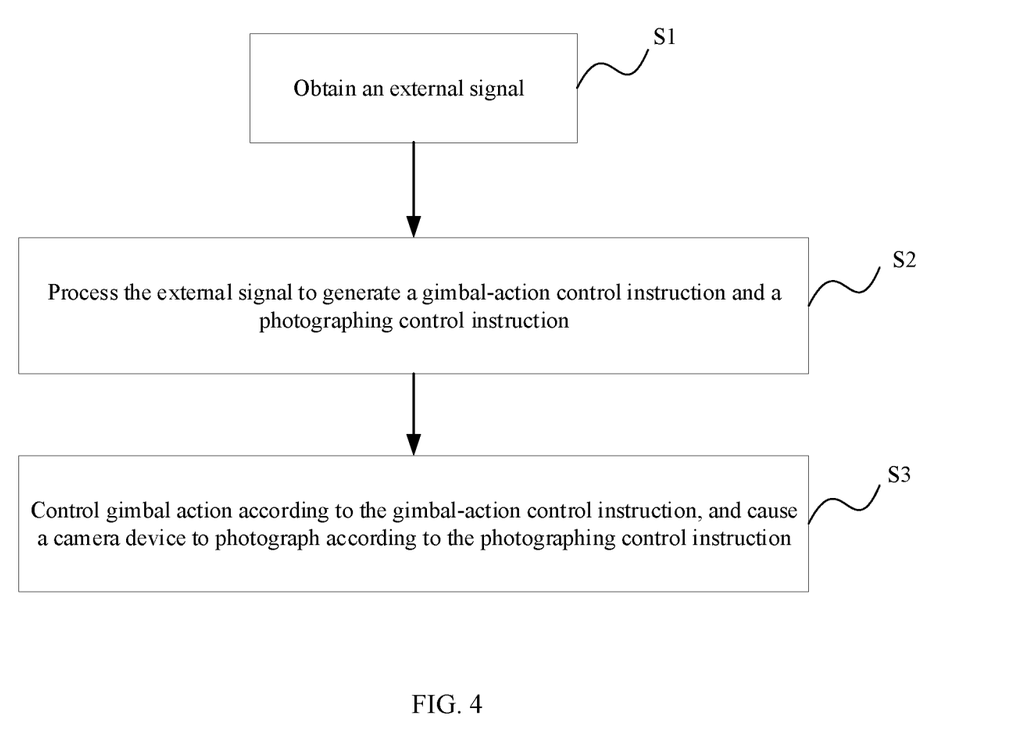
FIG. 4 is a schematic flowchart showing a gimbal photographing method according to some embodiments of the present disclosure.

FIG. 4 is a schematic flowchart showing a gimbal photographing method according to some embodiments of the present disclosure.

As shown in FIG. 4, at S1, an external signal is obtained.

At S2, the external signal is processed to generate a gimbal-action control instruction and a photographing control instruction.

At S3, gimbal action is controlled according to the gimbal-action control instruction, and a camera device is caused to photograph according to the photographing control instruction.

Figure 1:
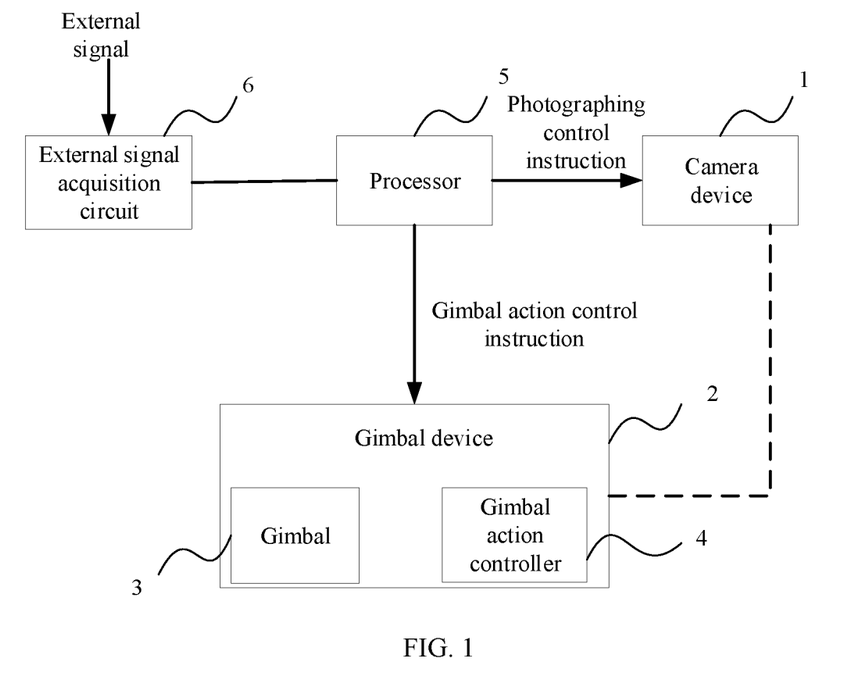
FIG. 1 is a schematic block diagram showing a gimbal camera system according to some embodiments of the present disclosure.

Referring to FIG. 1, an embodiment of the present disclosure is described. FIG. 1 is a schematic block diagram showing a gimbal camera system according to some embodiments of the present disclosure.

The gimbal camera system of FIG. 1 may perform the gimbal photographing method. The gimbal camera system includes a camera device 1, a gimbal device 2, a gimbal 3, a gimbal- The camera device 1 may be configured to photograph according to the photographing control instruction. The gimbal device 2 includes the gimbal 3 and the gimbal-action controller 4 configured to control the gimbal 3 to act. The camera device 1 is mounted at the gimbal 3. The processor 5 may be configured to process an external signal to generate the gimbal-action control instruction and the photographing control instruction, cause the gimbal-action controller 4 to control the gimbal 3 to act according to the gimbal-action control instruction and cause the camera device 1 to photograph according to the photographing control instruction.

The camera device 1 and the gimbal 3 may be formed integrally into, for example, a gimbal camera. The camera device 1 may also be detachably mounted at the gimbal. In this scenario, the camera device 1, for example, may include a mobile camera device, such as a camera, a video recorder, or a cell phone or a mobile terminal having a video recording function. The camera device 1 may photograph according to the photographing control instruction.

The photographing control instruction is an instruction used to control the camera device and can, for example, not only control on/off of the camera device 1, but also control the photographing parameters of the camera device 1.

The photographing parameters may include but are not limited to exposure time, aperture, focal length, ISO, predetermined scene mode, color temperature, white balance, etc., of the camera device 1. Changing the photographing parameters can enable a photographed video or image to have a rich performance effect.

The gimbal 3 of the gimbal device 2 may include, for example, a three-axis gimbal configured to perform three-dimensional actions in a pitch direction, a yaw direction, and a roll direction. The gimbal 3 may perform the actions of pitching, yawing, and rolling via the three-axis gimbal. In some embodiments, by using a gimbal of another structure such as a ball joint gimbal, the gimbal 3 may also perform the actions in the pitch direction, the yaw direction, and the roll direction.

In some other embodiments, a mechanism configured to translate may be added to the gimbal 3, for example, a translational shaft, arm, etc., to cause the gimbal to further perform a translational motion.

Further, the gimbal-action controller 4 may also control the gimbal to stay still during a part of the whole photographing process according to the gimbal control instruction.

The action of the gimbal 3 may also be adjusted manually in each of the dimensions. However, in some embodiments, the gimbal device 2 may include the gimbal-action controller 4, which may be configured to cause the gimbal 3 to perform the action according to the gimbal-action instruction. That is, the gimbal 3 may act according to the gimbal-action control instruction.

The processor 5 may be configured to process the external signal to generate the photographing control instruction used to control the camera device and the gimbal-action control instruction used to control the gimbal action.

The external signal may refer to a signal obtained outside of the gimbal camera system. The external signal may include, for example, a predetermined signal or a real-time signal, and may be analyzed in the processor 5 to generate a control instruction.

The external signal may include, for example, a piece of predetermined music, which is used as the background music of a video to be recorded. The external signal may include a real-time audio signal.

The external signal may include an optical signal, for example, an optical signal representing sunrise, sunset, meteors, fireworks, etc., or may include a predetermined optical signal.

The external signal may include a signal representing a scene mode, for example, one of predetermined photographing modes for different scenes, such as a landscape mode, a portrait mode, and a night scene mode.

The external signal may include a gesture signal. The gesture may be used to control the action of the gimbal or the photographing of the camera device.

In some embodiments, the gimbal camera system includes the processor 5. The processor 5 may be a processor of the gimbal device 2 or a processor of the camera device 1, or both the processor of the gimbal device 2 and the processor of the camera device 1 may share the functions of the processor 5. A communication connection may be built between the gimbal device 2 and the camera device 1 as needed to receive and send the instruction.

The communication connection between the gimbal device 2 and the camera device 1 may be a wired connection and may include but not limited to, for example, a cell phone carried by the gimbal may be connected to the gimbal through a data cable, or the integrated camera may be connected to the gimbal through contact pins or an interface. The communication connection between the gimbal device 2 and the camera device 1 may also be a wireless connection and include but not limited to, for example, the cell phone carried by the gimbal may be connected to the gimbal by a pairing communication manner such as Bluetooth, wireless, or near-field-communication (NFC), etc.

Further, the processor 5 may include a processor of an external control device. When the external control device completes processing the external signal, the processor may transmit the generated gimbal-action control instruction and the photographing control instruction to the gimbal device 2 and camera device 1, respectively.

The external signal acquisition circuit 6 (external signal receiver) may be configured to obtain the external signal and may include one or more of various sensors, for example, microphone, photosensitive element, etc., or a software acquisition module. For example, the user may import the external signal directly to the gimbal camera system through an external device. The external signal may be obtained at once, in batches, or in real-time. The external signal may be obtained using one of different acquisition methods according to the type of the external signal.

FIG. 1 shows a system block diagram for purpose of implementing an embodiment of the present disclosure. However, FIG. 1 shows an example and does not limit the present disclosure. FIG. 1 shows block(s), control line(s), and data line(s), that are needed to realize key technical features of the present disclosure, while various functional block(s), control line(s), and data line(s) configured to realize other functions are omitted in FIG. 1.

Referring to FIG. 1 and FIG. 4, embodiments of the present disclosure are described using an example of recording a video having the image motion meeting the specific requirement and the rich performance effect obtained by changing the photographing parameters, by the camera device 1 carried by the gimbal, using the functions of embodiments of the present disclosure.

At S1, an external signal is obtained.

The manner of the gimbal camera system obtaining the external signal is described above, which is not repeated here. In some embodiments, the external signal may include an audio signal. For example, the audio signal may include background music imported to the gimbal camera system by a user, or obtained through the microphone of the gimbal camera system.

Then, the processor 5 may analyze the background music.

For example, the processor 5 may analyze characteristics of the background music (audio signal) and divide the background music into at least one music segment according to an analysis result. The characteristics of the audio signal, for example, may include rhythm style of the music, for example, characteristics representing the speed of the music, such as allegro, andante, adagio, lento, etc., and characteristics representing musical expression, such as happy, lively, passionate, violent, etc. In some embodiments, according to an audio signal rhythm analysis technology, each rhythm style may correspond to an audio wave signal characteristic, such as amplitude, frequency, etc. When the processor 5 analyzes the background music, the audio signal may be processed through an algorithm corresponding to the existing characteristics. The processor 5 may analyze a rhythm style for each music segment of the background music and label the music segment. The label may correspond to one or more characteristics.

Then, the processor 5 may generate a gimbal-action control instruction and a photographing control instruction for each music segment. The gimbal-action control instruction is used to control the gimbal to perform a series of actions in the music segment. The photographing control instruction (including corresponding photographing parameters) may be used to control the camera device of the gimbal to photograph in the music segment.

For a music segment, a gimbal-action control instruction may be synchronized in time with a photographing control instruction. Both of the gimbal-action control instruction and the photographing control instruction may be synchronized in time with the music segment.

In some embodiments, for example, each label may be stored in a database by building a correspondence with a corresponding gimbal action and/or a photographing action. The database may be located inside or outside the gimbal camera system, or in networks, which may be retrieved by communication.

Each label may be stored in the database by building a correspondence with the corresponding photographing action (including parameter change).

For example, when a background music segment is labeled with "presto and violent" according to an analysis result of a background music segment, a gimbal action and photographing action corresponding to the label may be retrieved from the database. Thus, a gimbal-action control instruction and a photographing control instruction may be generated. The gimbal-action control instruction may cause the gimbal to continuously perform a small reciprocating motion in a pitch direction, a roll direction, or a yaw direction, such that a vibration effect of the photographing image may be obtained. Meanwhile, the photographing control instruction may include increasing contrast, saturation, etc., to obtain more intense and vivid colors. For example, the user may want to take an intense music segment to photograph a scene that keeps striking. That is, such gimbal-action control instruction and photographing control instruction may be used to obtain a better audio and visual effect.

For example, the processor 5 may obtain the background music and divide the background music into four music segments according to the characteristics of the audio signal. The four music segments may be labeled with "adagio and soft," "moderato and beautiful," "allegro and lively," and "lento and like a song."

For the gimbal-action control instruction and the photographing control instruction, for example, in an "adagio and soft" music segment, the gimbal may be caused to perform a pitch action and photograph with default parameters. In a "moderato and beautiful" music segment, the gimbal may be caused to perform a roll action, and the lens is zoomed in. In an "allegro and lively" music segment, the gimbal may be caused to perform a vibrating motion, color temperature may be reduced to cause the image to be biased toward warm colors. In a "lento and like a song" music segment, the gimbal may be caused to stay still, and the photographing image may gradually become dark until the photographing stops.

The above description is merely an example. More than one action or an action including a plurality of actions in different dimensions may be performed in each music segment. More than one photographing action (e.g., changing more than one photographing parameters) may be performed in each music segment.

In some other embodiments, for example, at the time when the gimbal completes the action of the "adagio and soft" music segment, a pitch angle (i.e., attitude) of the gimbal or the photographing image may not be suitable for the following "allegro and lively" music segment.

In this scenario, a transition may be considered to be added between the music segments. For example, the gimbal may be caused to perform a motion at the end of the "adagio and soft" music segment or at the beginning of the "moderato and beautiful" music segment to adjust the pitch angle (i.e., attitude) of the gimbal to an initial attitude used to perform the moderato music segment and cause the photographing parameters of the camera device to be initial parameters used to perform the moderato music segment.

As such, all the gimbal-action control parameters and the photographing control parameters may be generated.

The above process S2 includes processing the external signal to generate the gimbal-action control instruction and the photographing control instruction.

Subsequently, the processor 5 may control the gimbal-action controller 4 to cause the gimbal to perform the corresponding action according to the gimbal-action control instruction and cause the camera device 1 to photograph according to the photographing control instruction.

Then, the processor 5 may be configured to combine the recorded video and the background music.

As such, a video may be obtained as follows. The video image may move up and down in the "adagio and soft" music segment of the background music. Then, the video image may roll, and the lens may be gradually zoomed in in the "moderato and beautiful" music segment of the background music. Further, the video image may vibrate, and the color tone may gradually shift to warm colors in the "allegro and lively" music segment of the background music. Finally, the video image may stay still and gradually become dark until black, and the recording may stop in the "lento and like a song" music segment of the background music.

A predetermined action may be arranged between the music segments as needed, for example, an action to cause the gimbal to return to an initial position or cause the camera device to return to default photographing parameters. When being reflected in the video, the predetermined action may become a transition image.

The above example describes embodiments of the present disclosure. However, the present disclosure is not limited to such embodiments.

For example, in some embodiments, the correspondence may be built between the label representing the characteristics of the external signal and the gimbal action and/or the photographing action, and corresponding relationship may be stored in the database, which is not limited here. For example, an artificial intelligence (AI) function may be installed in the processor, which may determine to select an appropriate action group to photograph via the AI function.

For example, in some embodiments, the characteristic of the background music (i.e., an audio signal) may include speed and expression, which are not limited. The characteristic may also include a rhythm point of the music, for example, a rhythm point may change in the verse, chorus, and repetition of a song, and the music segment may be divided at the rhythm point. A specific type of the characteristic of the music is not limited here.

For example, in some embodiments, the situation is described when the external signal is the predetermined signal. When the external signal is a real-time signal, embodiments of the present disclosure may also be implemented.

For example, when the external signal is an optical signal representing sunrise, the processor 5 may be configured to generate the gimbal-action control instruction and the photographing control instruction according to the sun to photograph with the sun at the center of the image and adjust the aperture of the camera device according to an incidental light amount.

For example, in some embodiments, the external signal is the audio signal, which is not limited here. For example, the external signal may include a group of multiple signals, such as audio and optical signals.

According to the gimbal of the present disclosure, the camera device carried by the gimbal may record the video with the image motion of the specific requirement and the rich performance effect by changing the photographing parameters. Meanwhile, the camera device may analyze the external signal automatically and correspond the external signal to the gimbal action and the photographing action, such that a normal consumer may also easily record a video with an audio and visual rendering capability.

Figure 2:
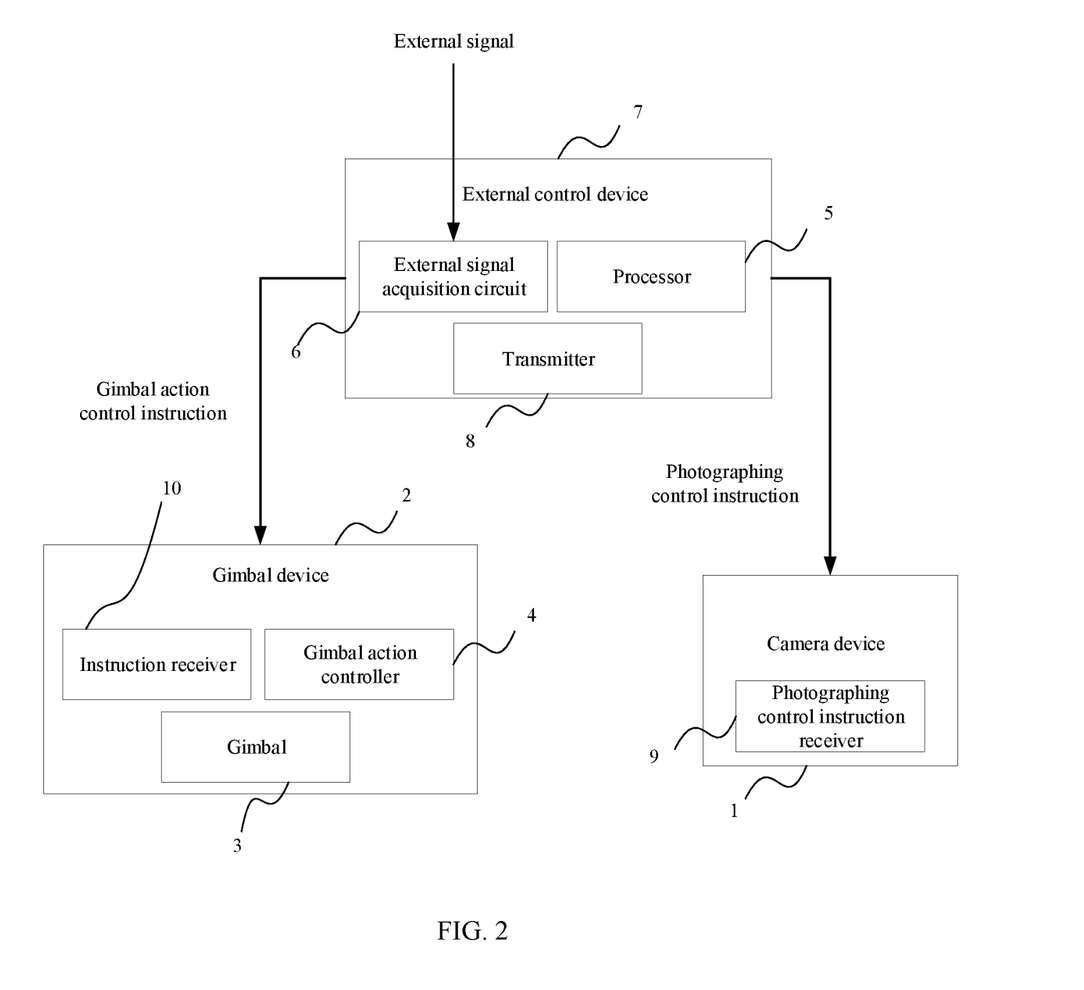
FIG. 2 is a schematic block diagram showing a gimbal camera system according to some other embodiments of the present disclosure.

FIG. 2 is a schematic block diagram showing an example of the gimbal camera system according to some other embodiments of the present disclosure.

As shown in FIG. 2, the gimbal camera system includes the camera device 1, the gimbal device 2, the gimbal 3, the gimbal-action controller 4, the processor 5, the external signal acquisition circuit 6, an external control device 7, a transmitter 8, a photographing control instruction receiver 9, and an instruction receiver 10.

In the drawings, same reference numeral is used for the same structure and a block performing the same function of the implementations. The repeated description is omitted.

The external control device 7 may be configured to obtain and process an external signal. Therefore, the external control device 7 includes the processor 5, the external signal acquisition circuit 6, and the transmitter 8.

The external signal acquisition circuit 6 may be configured to obtain the external signal. The processor 5 may be configured to process the external signal to generate the gimbal-action control instruction and the photographing control instruction.

The external control device 7 may be configured to build a communication connection with each of the gimbal device 2 and the camera device 1. The transmitter 8 may be configured to transmit the gimbal-action control instruction to the gimbal device 2 and transmit the photographing control instruction to the camera device 1.

The gimbal device 2 includes the gimbal 3, the gimbal-action control device 4, and the instruction receiver 10. The instruction receiver 10 may be configured to receive the instruction from the external control device 7. For example, the instruction may be referred to as the gimbal-action control instruction here. The gimbal-action control device 4 may be configured to cause the gimbal to perform the action according to the gimbal-action control instruction.

The camera device 1 includes the photographing control instruction receiver 9. The photographing control instruction receiver 9 may be configured to receive the photographing control instruction from the external control device 7 to cause the camera device 1 to photograph.

In accordance with embodiments of the present disclosure, the same effect of the implementations may be obtained.

Figure 3:
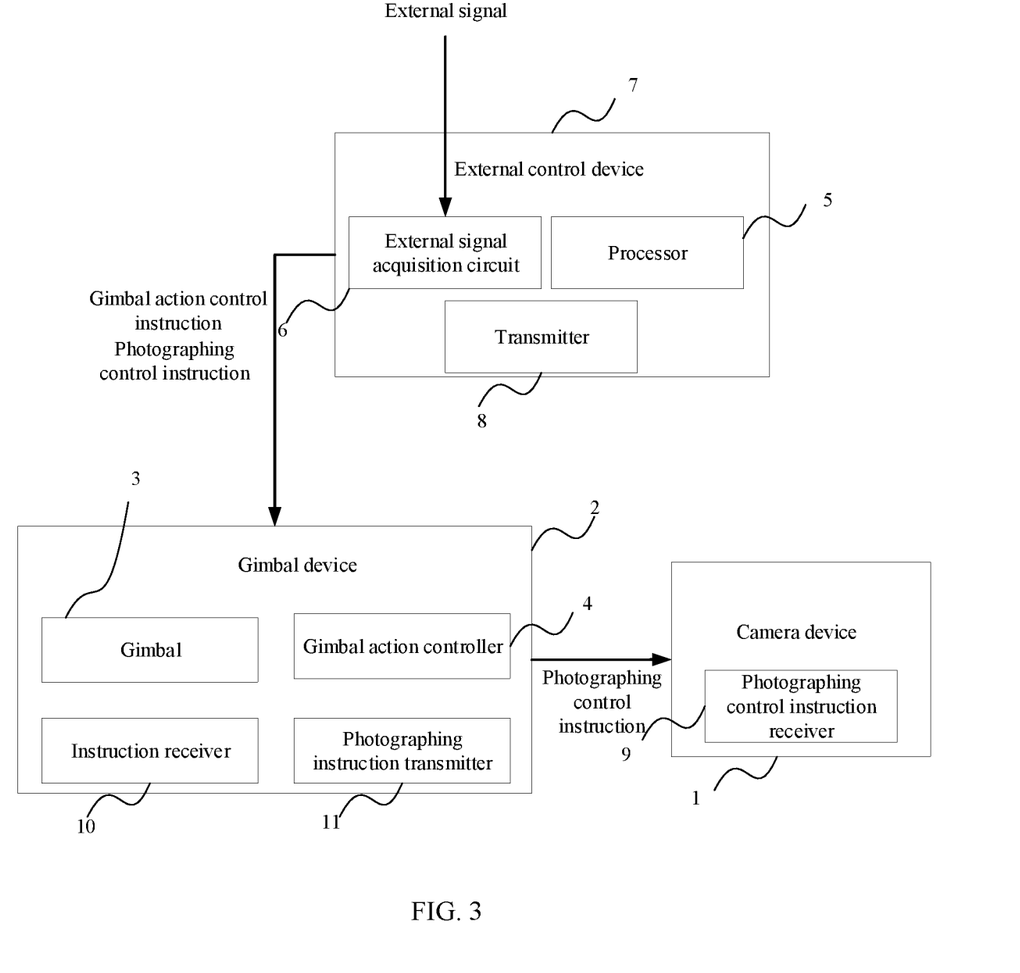
FIG. 3 is a schematic block diagram showing a gimbal camera system according to some other embodiments of the present disclosure.

FIG. 3 is a schematic block flowchart showing another example of the gimbal camera system according to some other embodiments of the present disclosure.

As shown in FIG. 3, the gimbal camera system includes the camera device 1, the gimbal device 2, the gimbal 3, the gimbal-action controller 4, the processor 5, the external signal acquisition circuit 6, the external control device 7, the transmitter 8, the photographing instruction receiver 9, the instruction receiver 10, and a photographing control instruction transmitter 11.

The same reference numeral is used for the same structure and a block performing the same function of the implementations. The repeated description is omitted. A difference between embodiments and implementations are mainly described below.

Some embodiments are variations of the above embodiments. The differences may include that the external control device 7 may be communicatively connected to the gimbal device 2 and transmit the gimbal-action control instruction and the photographing control instruction to the gimbal device 2. The gimbal device 2 may be communicatively connected to the camera device 1 and transmit the photographing control instruction to the camera device 1.

The external control device 7 may include the same structure of the external control device 7 of the previous embodiments.

The gimbal device 2 includes the gimbal 3, the gimbal-action controller 4, the instruction receiver 10, and the photographing control instruction transmitter 11.

The instruction receiver 10 may be configured to receive the gimbal-action control instruction and the photographing control instruction from the external control device 7. The gimbal-action controller 4 may be configured to cause the gimbal 3 to perform the action according to the gimbal-action control instruction. The photographing control instruction transmitter 11 may be configured to transmit the photographing control instruction to the camera device 1.

The camera device includes the photographing control instruction receiver 9. The photographing control instruction receiver 9 may be configured to receive the photographing control instruction from the gimbal device 2. The camera device 1 may photograph according to the photographing control instruction.

The above external control device 7, for example, may be implemented by a mobile terminal having a communication function, e.g., a smartphone, or may be implemented by installing a software on a general-purpose computer.

Further, the gimbal camera system of the present disclosure may be implemented as a terminal carrying the gimbal, for example, tripod, UAV, gimbal camera, etc.

In accordance with the present disclosure, the above description of the flowchart may be implemented by the gimbal photographing method, gimbal camera system, and computer-readable storage medium.

The computer-readable medium shown in the present disclosure may be a computer-readable signal medium or a computer-readable storage medium, or a combination thereof. The computer-readable storage medium may be, for example, but not limited to, an electric, magnetic, optical, electromagnetic, infrared, or semiconductor system, apparatus, or device, or a combination thereof. More specific examples of computer-readable storage media may include, but are not limited to an electrical connection with one or more wires, a portable computer disk, a hard disk, random access memory (RAM), read-only memory (ROM), erasable programmable read-only memory (EPROM or flash memory), optical fiber, portable compact disk read-only memory (CD-ROM), an optical storage device, a magnetic storage device, or any suitable combination thereof. In the present disclosure, the computer-readable storage medium may be any tangible medium that contains or stores a program, and the program may be used by an instruction execution system, apparatus, or device, or in combination with them. In the present disclosure, a computer-readable signal medium may include a data signal propagated in baseband or as a part of a carrier wave, which carries a computer-readable program code. This propagated data signal may include many forms, including but not limited to an electromagnetic signal, an optical signal, or any suitable combination thereof. The computer-readable signal medium may also include any computer-readable medium other than the computer-readable storage medium. The computer-readable medium may send, propagate, or transmit the program used by or in combination with the instruction execution system, apparatus, or device. The program code included in the computer-readable medium can be transmitted by any suitable medium, including but not limited to wireless, wired, optical cable, radio frequency (RF), etc., or any suitable combination thereof.

The flowcharts and block diagrams in the accompanying drawings illustrate the possible architecture, functions, and operations of the system, method, and computer program product according to various embodiments of the present disclosure. At this point, each block in the flowchart or block diagram may represent a module, program segment, or part of code. The above-described module, program segment, or part of the code contains one or more executable instructions for realizing the specified logical function. In some alternative embodiments, the functions labeled in the block may also occur in a different order from the order labeled in the drawings. For example, two blocks shown in succession may be executed substantially in parallel, or may sometimes be executed in the reverse order, depending on the functions involved. Each block of the block diagram or flowchart, and the combination of blocks of the block diagram or flowchart, may be implemented by a dedicated hardware-based system that performs the specified function or operation or may be implemented by a combination of dedicated hardware and computer instructions.

Embodiments of the present disclosure are described above. However, these embodiments are merely used to illustrate the present disclosure but not intended to limit the scope of the present disclosure. Although embodiments are described above, this does not mean that the solutions of embodiments may not be combined for use. The scope of the present disclosure is defined by the appended claims and their equivalents. Without departing from the scope of the present disclosure, those skilled in the art may make various replacements and modifications, and these replacements and modifications should be within the scope of the present disclosure.

What is claimed is:

1. A gimbal photographing method comprising:
   obtaining an external signal;
   processing the external signal to generate one or more gimbal action control instructions and one or more photographing control instructions;
   controlling a gimbal to perform a corresponding action according to at least one of the one or more gimbal action control instructions; and
   controlling a camera device to perform photographing according to at least one of the one or more photographing control instructions, the at least one of the one or more photographing control instructions causing the camera device to photograph along with the action performed by the gimbal during at least part of a whole photographing process,
   wherein the external signal is an audio signal;
   the method further comprising:
   analyzing a characteristic of the audio signal to obtain an analysis result; and
   dividing the audio signal into one or more audio segments according to the analysis result.

2. The method of claim 1, wherein each of the one or more audio segments corresponds to one of the one or more gimbal action control instructions and one of the one or more photographing control instructions.

3. The method of claim 1, further comprising:
   combining the audio signal with a video recorded by the camera device.

4. The method of claim 1, wherein:
   the one or more photographing control instructions are synchronized in time with the one or more gimbal action control instructions.

5. The method of claim 4, further comprising at least one of:
   adding, before or after the one or more gimbal action control instructions, an instruction to cause the gimbal to perform a predetermined action; or
   adding, before or after the one or more photographing control instructions, an instruction to cause the camera device to perform a predetermined action.

6. The method of claim 1, wherein controlling the gimbal to perform the corresponding action includes controlling the gimbal to perform at least one of a pitch action, a yaw action, a roll action, a translation, or staying still.

7. The method of claim 6, wherein:
   the gimbal includes one or more shafts; and
   the one or more gimbal action control instructions are used to control at least one of the one or more shafts to rotate or stay still.

8. The method of claim 6, wherein:
the gimbal includes one or more translational mechanisms; and
the one or more gimbal action control instructions are used to control at least one of the one or more translational mechanisms to move or stay still.

9. The method of claim 1, wherein the external signal is a predetermined signal or a signal obtained in real-time.

10. A gimbal camera system comprising:
a gimbal device including:
a gimbal; and
a gimbal action controller configured to cause the gimbal to perform an action;
a camera device carried by the gimbal;
an external signal acquisition circuit configured to obtain an external signal; and
a processor configured to control the gimbal device and the camera device to: process the external signal to generate one or more gimbal action control instructions and one or more photographing control instructions;
control the gimbal action controller to cause the gimbal to perform a corresponding action according to at least one of the one or more gimbal action control instructions; and
control the camera device to photograph according to at least one of the one or more photographing control instructions, the camera device being caused to photograph along with the action performed by the gimbal during at least part of a whole photographing process,
wherein the external signal is an audio signal, and the processor is further configured to:
analyze a characteristic of the audio signal to obtain an analysis result; and
divide the audio signal into one or more audio segments according to the analysis result.

11. The system of claim 10, wherein each of the one or more audio segments corresponds to one of the one or more gimbal action control instructions and one of the one or more photographing control instruction.

12. The system of claim 10, the processor is further configured to:
combine the audio signal with a video recorded by the camera device.

13. The system of claim 10, wherein:
the one or more photographing control instructions are synchronized in time with the one or more gimbal action control instructions.

14. The system of claim 13, the processor is further configured to perform at least one of:
adding, before or after the one or more gimbal action control instructions, an instruction to cause the gimbal to perform a predetermined action; or
adding, before or after the one or more photographing control instructions, an instruction to cause the camera device to perform a predetermined action.

15. The system of claim 10, wherein:
the gimbal action controller controls the gimbal to perform at least one of a pitch action, a yaw action, a roll action, a translation, or staying still.

16. The system of claim 15, wherein:
the gimbal includes one or more shafts; and
the one or more gimbal action control instructions are used to control at least one of the one or more shafts to rotate or stay still.

17. The system of claim 15, wherein:
the gimbal includes one or more translational mechanisms; and
the one or more gimbal action control instructions are used to control at least one of the one or more translational mechanisms to move or stay still.

18. The system of claim 10, wherein:
the external signal is a predetermined signal or a signal obtained in real-time.

* * * * *